(12) United States Patent
Sakaguchi et al.

(10) Patent No.: US 8,141,739 B2
(45) Date of Patent: Mar. 27, 2012

(54) HYDROGEN STORAGE TANK AND MANUFACTURING METHOD FOR THE SAME

(75) Inventors: Yoshiki Sakaguchi, Kashiwara (JP); Hideaki Nishiwaki, Kashiwara (JP); Naoki Sakaguchi, Kashiwara (JP); Takeshi Yamamoto, Kashiwara (JP); Shigeru Tsunokake, Tokyo (JP); Tatsuya Fuura, Tokyo (JP); Shogo Watanabe, Tsukuba (JP); Yasumasa Maeda, Shirosato-machi (JP)

(73) Assignees: Samtech Corporation, Osaka (JP); Japan Metals & Chemicals Co., Ltd., Tokyo (JP)

( * ) Notice: Subject to any disclaimer, the term of this patent is extended or adjusted under 35 U.S.C. 154(b) by 613 days.

(21) Appl. No.: 11/763,516

(22) Filed: Jun. 15, 2007

(65) Prior Publication Data

US 2008/0142523 A1    Jun. 19, 2008

(30) Foreign Application Priority Data

Dec. 15, 2006 (JP) .................................. 2006-338319

(51) Int. Cl.
B65D 88/12    (2006.01)
(52) U.S. Cl. ........................................ 220/562; 220/586
(58) Field of Classification Search .................. 220/589, 220/588, 586, 582, 581, 62.22, 62.19, 62.11, 220/585, 591, 592, 562, 590; 96/108, 147, 96/146; 277/590; 206/0.6, 0.7
See application file for complete search history.

(56) References Cited

U.S. PATENT DOCUMENTS
4,546,895 A * 10/1985 Pflederer ...................... 220/589
(Continued)

FOREIGN PATENT DOCUMENTS
JP    2000-055300    2/2000
JP    2004-270861    9/2004
JP    2004-286177    10/2004

OTHER PUBLICATIONS

New Energy and Industrial Technology Development Organization; (http://www.nedo.go.jp/) Jun. 16, 2006; pp. 1-6.

Primary Examiner — Jacob K Ackun
Assistant Examiner — Kareen Rush
(74) Attorney, Agent, or Firm — Antonelli, Terry, Stout & Kraus, LLP

(57) ABSTRACT

[Object] A safe hydrogen storage tank in a highly reliable form where it is difficult for fatigue failure to occur is provided as a hydrogen storage tank where a cartridge is filled with a hydrogen occluding substance and contained within an integrally molded liner made of a metal.

[Means for Achieving Object] A cartridge 10 is formed of a cartridge main body portion 11, a fixed side axial portion 13 and a free side axial portion 12, and an integrally molded liner 20 which is seamless is formed of a liner torso portion 21, a fixed side end portion 25 where a fixed side opening 25a is created via a portion in dome form 24 and a free side end portion 23 where a free side opening 23a for supporting a support plug 30 is created via a portion in dome form 22 in order to support a free side axial portion 12a, in such a manner that the fixed side opening 25a fixes and supports the fixed side axial portion 13 and is sealed by a sealing plug 40 while the free side opening 23a is sealed by the support plug 30, and the free side axial portion 12 is inserted into and supported by the recess 31 created in the support plug 30 so as to be moveable forward and backward in the direction of the axial line.

3 Claims, 4 Drawing Sheets

U.S. PATENT DOCUMENTS

| | | | |
|---|---|---|---|
| 5,875,648 A * | 3/1999 | Boye et al. | 62/480 |
| 7,169,214 B2 * | 1/2007 | Kubo et al. | 96/108 |
| 7,556,171 B2 * | 7/2009 | Ishimaru | 220/586 |
| 2003/0066836 A1 * | 4/2003 | Sakaguchi et al. | 220/581 |
| 2004/0182869 A1 * | 9/2004 | Kubo et al. | 220/581 |

* cited by examiner

[Fig 2]

(a) Main Part Forming Step
formation of cartridge
formation of one side processed liner (molding of free side end portion)
inspection of inner surface

↓

(b) Spinning Step
supporting of free side axial portion with temporary support plug
supporting of fixed side axial portion with temporary support rod
supporting of liner torso portion
molding of two side processed liner

↓

(c) Heat Treatment Step (Heating and Cooling)
improvement of strength of liner

↓

(d) Sealing Step
sealing of free side end portion and fixed side end portion

↓

(e) Step of Filling with Hydrogen Occluding Alloy
filling of cartridge main body portion with hydrogen occluding alloy

[Fig 3]
(a) 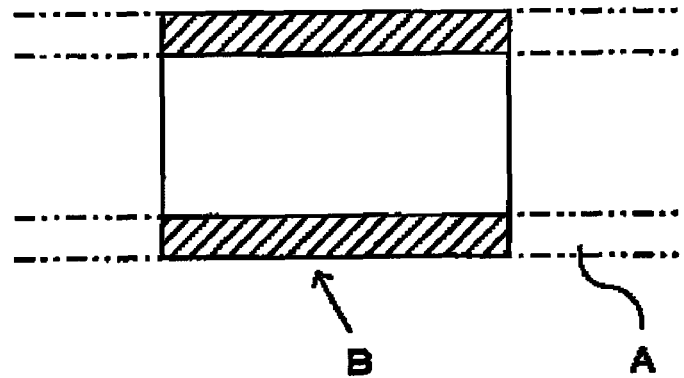
(b) 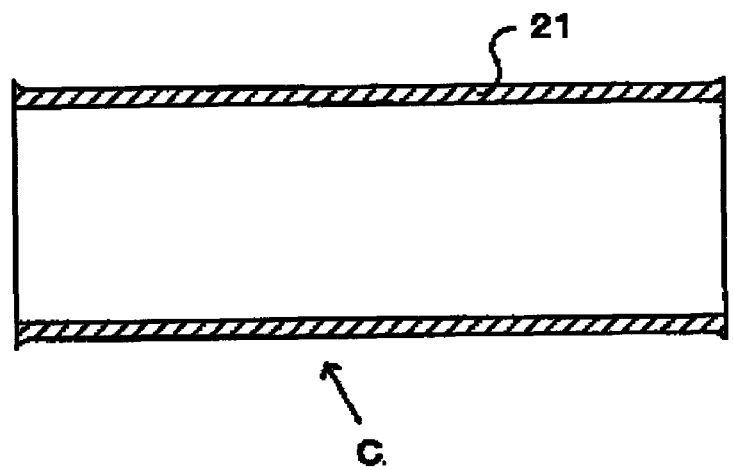
(c) 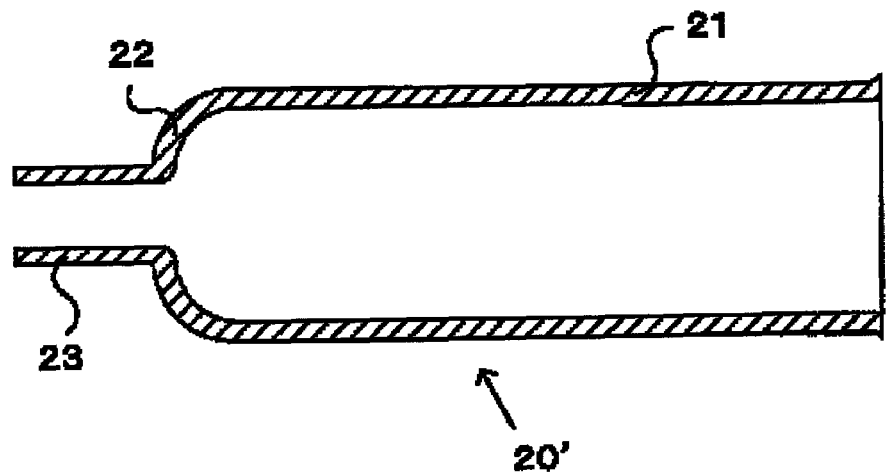

[Fig 4]
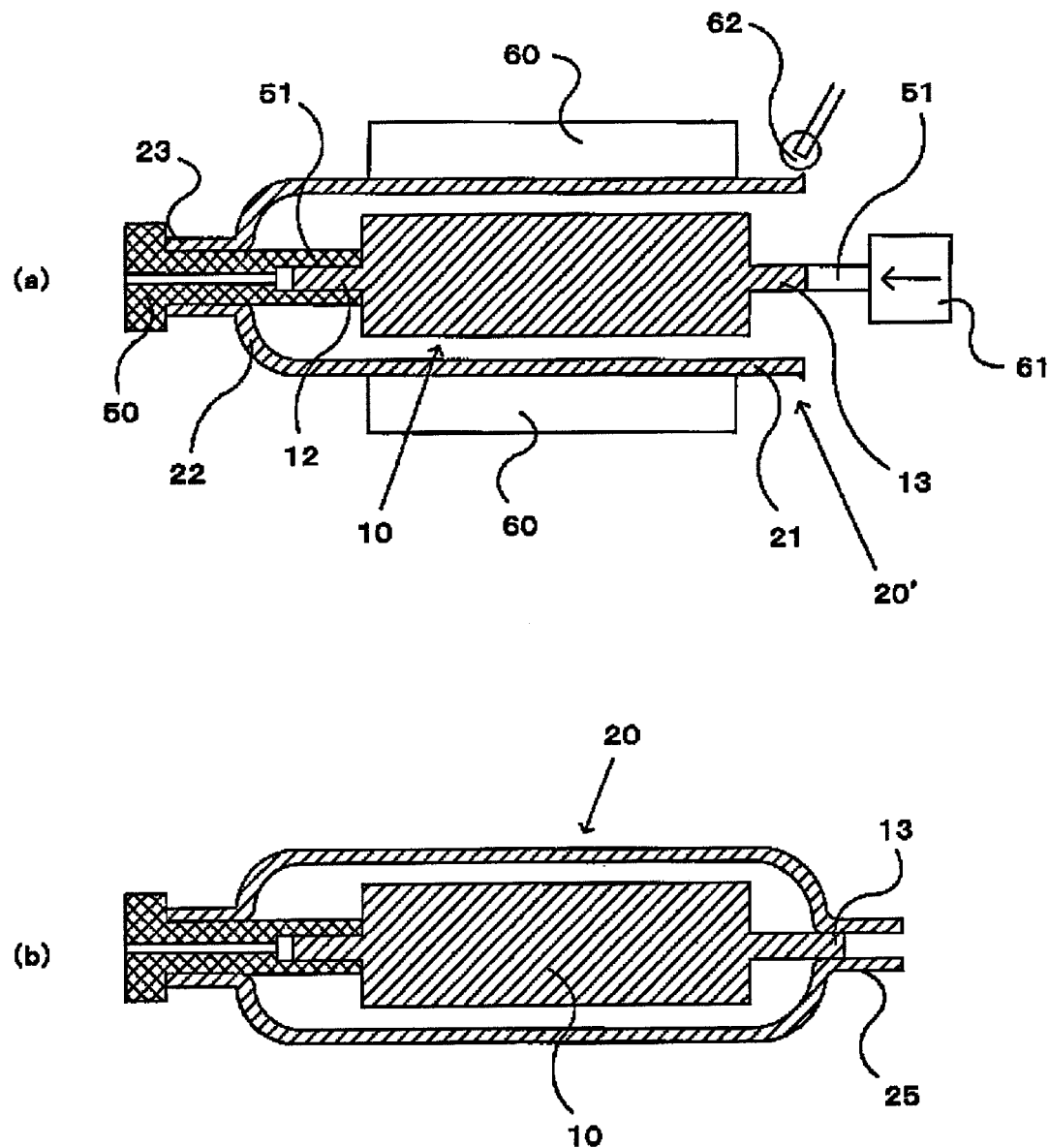

HYDROGEN STORAGE TANK AND MANUFACTURING METHOD FOR THE SAME

BACKGROUND OF THE INVENTION

1. Field of the Invention

The present invention relates to a hydrogen storage tank which is mainly used as a hydrogen fuel tank for an automobile, and in particular, to a hybrid type hydrogen storage tank where a cartridge is filled with a hydrogen occluding substance and contained within a tank.

2. Description of the Related Art

In recent years, together with global warming, carbon dioxide emitted from vehicles has become a problem, and efforts have been made to reduce the amount of carbon dioxide emissions. Fuel battery automobiles use power which is generated through an electrochemical reaction between hydrogen and oxygen as an energy source and does not emit carbon dioxide in the reaction process, and therefore, have been developed as automobiles for the next generation. Fuel battery automobiles are equipped with a hydrogen storage tank which works as a supply source of hydrogen, which is the fuel. It is important for the hydrogen storage tank to be safe, and it is required that the volume occupied by one hydrogen storage tank is as small as possible and the amount of hydrogen with which the hydrogen storage tank is filled is large. As the hydrogen storage tank which satisfies these requirements, a hydrogen storage tank in which a hydrogen occluding alloy is built in has been developed.

A hydrogen storage tank where a cylindrical container is filled with a hydrogen occluding alloy and a flange is developed as the opening of an end portion of the cylindrical container, for example, is disclosed (Patent Document 1).

In this case, the higher the pressure for filling the hydrogen gas is, the greater the amount of hydrogen that can be stored becomes, and airtightness involving the flange portion having a large diameter is not sufficient under high pressure, and therefore, there is a possibility of leakage.

In addition, a pressure container is disclosed where the liner is of a divided type, an opening of which the dimensions allow a unit for occluding hydrogen where a metal container is filled with a hydrogen occluding alloy to be inserted is provided, and measures have been taken in order to secure the sealing of the divided portion (see Patent Document 2). In this case, the smaller the diameter of the divided portion is, the smaller the force that is applied to the divided portion as a result of the pressure within the container is, and therefore, the easier it becomes to increase sealing, but the diameter of the divided portion cannot be made smaller than the outer diameter of the hydrogen occluding unit, and therefore, the possibility of leakage occurring due to high pressure at a certain level or higher, which exceeds the limit of the withstanding pressure of the sealing material or the like, becomes high.

Furthermore, more attention should be paid to the divided type liner because leakage may still occur in the sealed portion even if sealing can be secured in comparison with an integrally molded liner without sealing, and therefore, it is desirable to use an integrally molded liner, if possible.

In contrast, a hydrogen storage tank is disclosed where a manufacturing method for a gas storage tank, according to which drawing is carried out on the outer wall material (tank container) around the opening, is adopted after the outer wall material contains a filled portion which is filled with a hydrogen occluding alloy (heat exchanger), and thereby, the size of the opening of the outer wall material is large enough not to hinder the operation of the containment of the filled portion within the outer wall material, and the size of the opening of the outer wall material (opening for connection) is small enough to make it easy to secure airtightness of the tank so that the tank can bear the gas pressure from the inside when a gas is stored (see Patent Document 3).

According to this document, an integrally molded tank made of a metal is manufactured in accordance with the following method. That is to say, an aluminum alloy in columnar form which is to become a tank container (tank container before processing) is prepared, and a heat exchanger which is filled with a hydrogen occluding alloy is contained within this column. At this time, a support is provided between the aluminum alloy (tank container before processing) and the heat exchanger in such a manner that the weight of the heat exchanger is supported by the aluminum alloy (tank container before processing) via the support.

Then, drawing (drawing around the openings) is carried out at the two ends of the aluminum alloy (tank container before processing) so that the openings at the two ends are reduced in size so as to be converted to the openings for connection. As a result, a tank container having small openings for connection (openings) at both ends is formed.

After that, heat treatment (heating and cooling) is carried out on the tank container so that the fatigue strength of the aluminum alloy is increased. That is to say, the fatigue strength should be increased through heat treatment because the internal pressure increases and decreases when the filling of the hydrogen occluding alloy with hydrogen and the releasing of hydrogen are repeated, and therefore, the tank container expands and contracts, and thus, metal fatigue gradually increases. After the heat treatment, a reinforcing layer is formed around the outer periphery of the tank container, and thus, a hydrogen storage tank is completed.

It is disclosed that a hydrogen storage tank manufactured in the above described procedure has a light weight and a high resistance to fatigue, and in addition, allows hydrogen to be stored under a pressure of no lower than 35 MPa, and thus, an excellent hydrogen storage container can be formed.

[Patent Document 1] Japanese Unexamined Patent Publication 2000-55300

[Patent Document 2] Japanese Unexamined Patent Publication 2004-270861

[Patent Document 3] Japanese Unexamined Patent Publication 2004-286177

DISCLOSURE OF THE INVENTION

Problem to be Solved by the Invention

A tank container (liner), which is manufactured, as disclosed in Patent Document 3, in accordance with a method where a filled portion (cartridge) which is filled with a hydrogen occluding alloy in advance is placed in a space within a cylindrical metal having large openings, and after that, drawing is carried out on the cylindrical metal around the openings at both ends so that the openings are converted to openings for connection which are smaller than the outer diameter of the filled portion (cartridge), has excellent resistance to pressure and is reliable as a liner used as a tank for storing hydrogen under high pressure. However, there are problems with the structure and the manufacturing process which should be solved.

That is to say, according to this manufacturing method, the filled portion (cartridge) is supported by a support provided between the tank container (liner) and the filled portion (cartridge). Accordingly, the inner surface of the tank container (liner) makes contact with the support so as to support the load of the filled portion (cartridge), and therefore, it is easy for the inner surface of the container to be scratched through friction with the support as a result of the impact or thermal expansion. The tank container repeatedly expands and contracts as a result of the filling with and the releasing of the hydrogen gas, and therefore, fatigue of the tank container increases, and in the case where the inner surface of the tank container is scratched, it becomes easy for fatigue failure to occur from there. Therefore, it is desirable for the inner surface of the tank container to be maintained in a no contact state. In addition, in the case where the support makes contact with the inner surface of the tank container, a safety check process to see if scratching has occurred in the portion that makes contact with the support becomes necessary.

Furthermore, the portion of the tank container which makes contact with the support (torso portion of the liner) is thin in comparison with the portions in the vicinity of the openings for connection (openings) at both ends of the tank container and weak against heat at the time of heat treatment. Therefore, there is a risk that the portion to which force is applied via the support may be deformed in the case where heat treatment is carried out in a state where the load of the filled portion (cartridge) is supported.

Therefore, an object of the present invention is to provide a hydrogen storage tank having a structure where a cartridge (filled portion) is filled with a hydrogen occluding substance and contained within an integrally molded liner which is seamless and made of a metal, which is a safe hydrogen storage tank in a highly reliable form where it is difficult for fatigue failure to occur.

Another object of the present invention is to provide a hydrogen storage tank having a structure where the inner surface of the torso portion of the metal liner maintains a no contact state, and thus, the inspection of scratching on the inner surface is unnecessary when measures are taken in the manufacturing method.

Means for Solving Problem

The hydrogen storage tank according to the present invention which is made to solve the above described problems is a hydrogen storage tank having a cartridge which is filled with a hydrogen occluding substance and contained within a liner made of a metal, wherein the cartridge has: a cartridge main body portion in cylindrical form which is filled with the hydrogen occluding substance; a fixed side axial portion which is provided on one end side along the axial line of the cartridge main body portion; and a free side axial portion which is provided on the other end side along the axial line of the cartridge main body portion, the liner is integrally molded seamlessly of a liner torso portion having a space for containing the cartridge main body portion, a fixed side end portion which is provided on one end side of the liner torso portion so as to protrude via a portion in dome form and where a fixed side opening for supporting the fixed side axial portion of the cartridge is created, and a free side end portion which is provided on the other end side of the liner torso portion so as to protrude via a portion in dome form and where a free side opening for supporting the outer periphery of a support plug for supporting the free side axial portion of the cartridge is created, the fixed side opening of the liner fixes and supports the fixed side axial portion of the cartridge and is sealed by a sealing plug, the free side opening of the liner is sealed with the support plug, the free side axial portion of the cartridge is inserted into and supported by a recess created in the support plug so as to be moveable forward and backward in the direction of the axial line, a support plug flow path for connecting the recess to the outside is created in the support plug, and a cartridge flow path which penetrates through the free side axial portion so as to be connected to the cartridge main body portion is created in the cartridge.

Here, a hydrogen occluding alloy is an exemplary example of a "hydrogen occluding substance", which may be any substance having properties of occluding hydrogen, such as carbon nanotubes.

The "portion in dome form" is a region that has been processed through drawing so that the diameter changes from a large diameter of the liner torso portion to a small diameter of the free side end portion or the fixed side end portion. A bowl form, an elliptical form, a hemispherical form and the like are exemplary forms, but there is no particular limitation.

The liner is "integrally molded seamlessly" means that the entirety of the liner is formed of one piece of a metal material without the connection using a sealing material, such as a gasket, or the connection through a welded portion.

According to the present invention, the cartridge main body portion in cylindrical form in the hydrogen storage tank is filled with a hydrogen occluding substance. The fixed side axial portion which is provided so as to protrude from one end of the cartridge main body portion is supported in such a manner that the surroundings of the fixed side axial portion are fixed by the opening on the fixed side of the liner. Meanwhile, the free side axial portion which is provided so as to protrude from the other end of the cartridge main body portion is inserted into the recess of the support plug, and the outer periphery of the support plug is supported by the opening on the free side of the liner. As a result, the free side axial portion moves forward and backward in the direction of the axial line within the recess of the support plug when the cartridge expands and contracts under the influence of heat, and thus, the cartridge is stably supported at both sides even when the cartridge is deformed through expansion and contraction.

The liner is integrally molded from one piece of a metal material so that the entirety of the liner formed of the liner torso portion, the free side end portion, the fixed side end portion, the portion in dome form between the liner torso portion and the free side end portion, and the portion in dome form between the liner torso portion and the fixed side end portion becomes seamless. In addition, the cartridge is supported only by the free side end portion and the fixed side end portion of the liner, and the inner surface of the liner torso portion is maintained so as not to make any contact, and it has a structure where the inner surface of the liner torso portion is not scratched through contact after the liner has been integrally molded, and thus, it is not necessary to inspect the inner surface of the torso portion.

In addition, the free side opening is sealed with a support plug, and the fixed side opening is sealed with a sealing plug. In addition, a support plug flow path for connecting the recess to the outside is created in the support plug, and a cartridge flow path which penetrates through the free side axial portion and connects to the cartridge main body portion is created in the cartridge so that these flow paths can be used to fill the cartridge with a hydrogen occluding substance at the time of the manufacture of the hydrogen storage tank and to fill the cartridge with a hydrogen gas or release the hydrogen gas when the hydrogen storage tank is used.

Effects of the Invention

According to the present invention, a cartridge which is filled with a hydrogen occluding substance is contained within an integrally molded liner which is seamless and made of a metal, and the liner torso portion made of a metal can be maintained so as not to make any contact, and therefore, a safe hydrogen storage tank in a highly reliable form where it is difficult for fatigue failure to occur can be provided.

In addition, the inner surface of the integrally molded metal liner can be maintained so as not to make any contact, and thereby, it becomes unnecessary to inspect the inner surface of the liner torso portion, which is, in actuality, difficult to carry out after the completion of the liner.

Furthermore, the cartridge is supported at both ends in the structure, and therefore, can be supported and has good balance. In addition, the recess of the support plug absorbs the thermal expansion, the thermal contraction, and the movement forward and backward, which occurs at the time of the application of pressure, of the cartridge, and therefore, malfunctioning due to thermal strain or the like can be prevented.

Furthermore, a hydrogen occluding substance can be put into the cartridge via the support plug flow path and the cartridge flow path so that the cartridge is filled with the hydrogen occluding substance after the completion of the hydrogen storage tank having a structure where the cartridge is contained within the liner, and therefore, it becomes unnecessary to pay attention to the hydrogen occluding substance in order to make sure that it does not make contact with moisture during the manufacturing process for the tank (for example, during heat treatment).

Means for Solving Other Problems and Effects

In the above described invention, the liner may be formed of an aluminum alloy, and a fiber reinforced resin layer may be formed on the outside of the liner.

A reduction in the weight of the container can be achieved by using an aluminum alloy for the liner, and the strength can be reinforced so that safety and reliability can be increased by forming a fiber reinforced resin on the outside of the liner.

In addition, the manufacturing method for a hydrogen storage tank according to another aspect of the present invention is a manufacturing method for a hydrogen storage tank having a structure where a cartridge is filled with a hydrogen occluding substance and contained within an integrally molded metal liner which is seamless, including: (a) the main part forming step of preparing a cartridge which is made up of a cartridge main body portion in cylindrical form, a fixed side axial portion which is formed on one end side along the axial line of the cartridge main body portion and a free side axial portion which is formed on the other end side along the axial line of the cartridge main body portion, and a one side processed liner where a free side end portion having a free side opening is integrally molded on one end side of the liner torso portion, which can be contained by the cartridge main portion, via a portion in dome form; (b) the spinning step of molding the one side processed liner to a two side processed liner by inserting a temporary support plug which is supported by a free side opening into the free side opening so that the free side axial portion of the cartridge is supported by the temporary support plug and the fixed side axial portion of the cartridge is supported, and thus, the cartridge is supported at both ends, and furthermore, supporting the outer peripheral surface of the liner torso portion of the one side processed liner, and then, carrying out drawing on the liner torso portion on the side opposite to the side where the free side end portion of the one side processed liner is formed, and thereby, forming a portion in dome form, and at the same time, forming a fixed side end portion where a fixed side opening is created in order to support the fixed side axial portion of the cartridge so that the fixed side end portion protrudes from the portion in dome form; (c) the heat treatment step of carrying out heat treatment on the two side processed liner in which the cartridge is contained; (d) the sealing step of sealing the free side end portion while supporting the free side axial portion with a support plug having a recess into which the free side axial portion of the cartridge is inserted so as to be removable in the direction of the axial line, and sealing the fixed side end portion; and (e) the filling step of filling the cartridge with a hydrogen occluding substance by putting the hydrogen occluding substance into the cartridge via through holes created in the support plug and the free side axial portion.

According to this invention, a temporary support plug is inserted into the free side end portion of the one side processed liner in such a manner that the free side axial portion of the cartridge is supported, and furthermore, the fixed side axial portion of the cartridge is supported, and thus, the cartridge is supported at both ends. Furthermore, the outer peripheral surface of the liner torso portion of the one side processed liner is supported. In this state, drawing is carried out on the liner torso portion on the unprocessed side of the one side processed liner so that a portion in dome form is formed, and furthermore, a fixed side end portion where a fixed side opening is created is formed following the portion in dome form.

Subsequently, heat treatment is carried out. This heat treatment (heating and cooling with water) improves the resistance to fatigue of the metal.

Subsequently, the temporary support plug is removed and a support plug having a recess is used in such a manner that the free side axial portion is inserted into and supported by this recess. In addition, the fixed side opening is sealed with a sealing plug.

Subsequently, a hydrogen occluding substance is put into the cartridge via the through hole created in the support plug (support plug flow path) and the through hole created in the free side axial portion (cartridge flow path) so that the cartridge is filled with the hydrogen occluding substance.

In the above described process, a safe hydrogen storage tank in a highly reliable form having a structure where a cartridge which is filled with a hydrogen occluding substance is contained within an integrally molded liner which is seamless and made of a metal, and having a structure where the liner torso portion made of a metal is maintained so as not to make any contact, can be manufactured.

In the above described invention of a manufacturing method, the support of the cartridge in the spinning step (b) may be performed in such a manner that the temporary support plug is inserted into the free side end portion from the outside of the free side opening and the free side axial portion of the cartridge is inserted into and supported by the recess created in the temporary support plug, and furthermore, the fixed side axial portion of the cartridge is pressed by the temporary support rod in the direction of the axial line, and thus, the cartridge is supported at both ends.

As a result, the cartridge and the liner can be easily supported at the time of the spinning step.

BRIEF DESCRIPTION OF THE DRAWINGS

FIG. 2 is a diagram illustrating the manufacturing steps for the hydrogen storage tank of FIG. 1;

FIG. 3 is a schematic diagram illustrating the steps of forming a half-processed liner; and FIG. 4 is a schematic diagram illustrating the steps of forming a two side processed liner from a half-processed liner.
1 hydrogen storage tank
10 cartridge
11 main body portion
12 free side axial portion
12a cartridge flow path
13 fixed side axial portion
13a fluid supplying flow path
20 liner (two side processed liner)
20' half-processed liner
21 liner torso portion
22, 24 portions in dome form
23 free side end portion
23a free side opening
25 fixed side end portion
25a fixed side opening
30 support plug
31 recess
32 support plug flow path
40 sealing plug
41 annular member
42 fluid supplying flow path
50 temporary support plug

Figure 1:
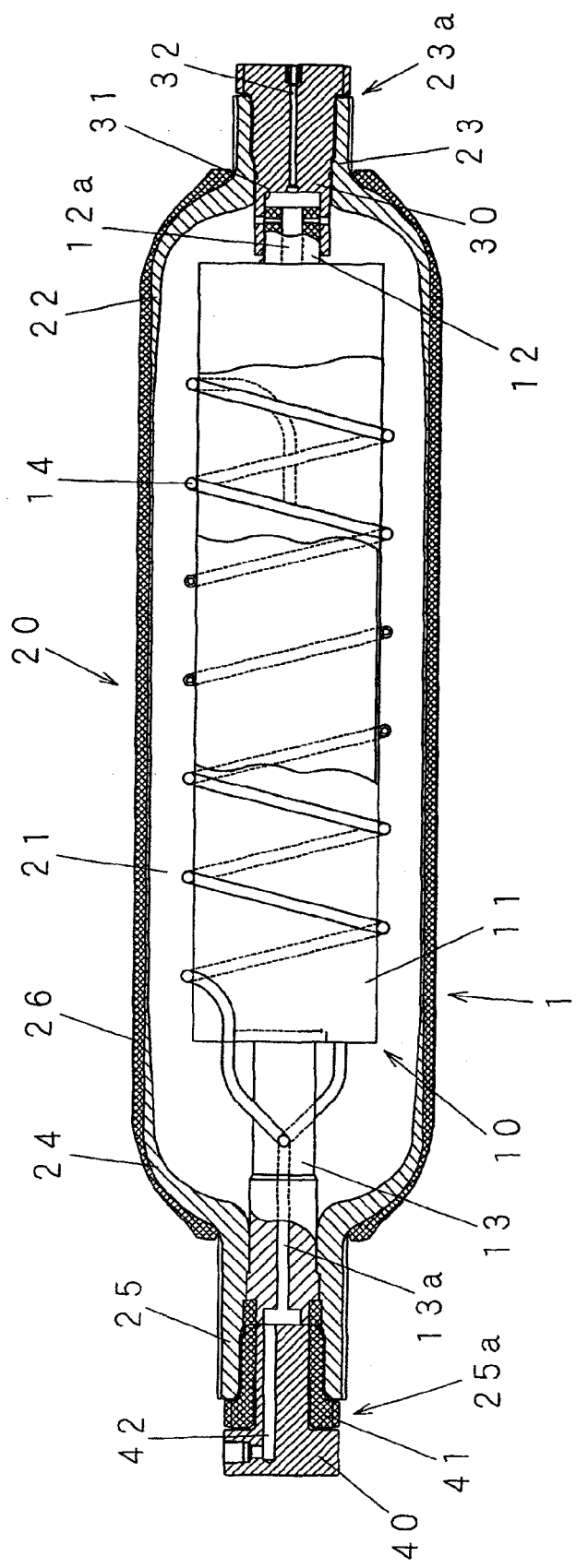
FIG. 1 is a cross sectional diagram showing the hydrogen storage tank according to one embodiment of the present invention.

DESCRIPTION OF THE PREFERRED EMBODIMENT (Structure of Hydrogen Storage Tank)

In the following, the structure of the hydrogen storage tank according to the present invention is described in reference to the drawings. FIG. 1 is a cross sectional diagram showing the hydrogen storage tank according to one embodiment of the present invention (here, the cartridge portion, of which a portion is removed, is not shown as a cross section, but as a front diagram).

This hydrogen storage tank 1 is mainly formed of a cartridge 10, a liner 20, a support plug 30 and a sealing plug 40.

The cartridge 10 is formed of a main body portion 11 in cylindrical form, a free side axial portion 12, which is provided so as to protrude in the direction of the axial line from one end side of the main body portion 11, and a fixed side axial portion 13, which is provided so as to protrude in the direction of the axial line from the other end side of the main body portion 11. The main body portion 11 is hollow so it can be filled with a hydrogen occluding alloy. In addition, a flow path pipe for heat exchange 14 is formed around the outer periphery (or inside) of the main body portion 11 in order to cool (when hydrogen is occluded) or heat (when hydrogen is released) the hydrogen occluding alloy. In addition, a through hole, which is to become a cartridge flow path 12a, is created in the free side axial portion 12 in the direction of the axial line and used as a flow path when the cartridge is filled with a hydrogen occluding alloy and a hydrogen gas is occluded or released. In addition, a flow path for supplying a fluid 13a is created in the fixed side axial portion 13 in the direction of the axial line and connected to the flow path pipe for heat exchange 14 of the main body portion 11 and the flow path for supplying a fluid 42 (reciprocating) of the below described sealing plug 40 so that a coolant or a heat medium circulates.

The liner 20 is formed of a liner torso portion 21 which contains the main body portion 11 of the cartridge inside, a portion in dome form 22 which is formed in the vicinity of the free side axial portion 12a, a free side end portion 23 which protrudes from the portion in dome form 22 and has a free side opening 23a, a portion in dome form 24 formed in the vicinity of the fixed side axial portion, and a fixed side end portion 25 which protrudes from the portion in dome form 24 and has a fixed side opening 25a. An aluminum alloy is used for the liner 20, and the entirety of the liner is integrally molded from one piece of a metal material in accordance with the below described manufacturing method.

The inner diameter of the liner torso portion 21 is in a size such that the main body portion 11 of the cartridge does not make contact with the liner torso portion 21. A screw trench, which engages with the support plug 30 when being inserted, is threaded within the free side opening 23a.

Furthermore, a fiber reinforced resin layer 26, which includes carbon fibers and the like, is formed on the outer surface of the liner 20 so that the strength of the liner is reinforced and the resistance to pressure is increased.

The support plug 30 is inserted into the free side opening 23a from the outside and engages with the free side end portion 23. A gasket, not shown, is attached between the free side end portion 23 and the support plug 30, and therefore, this portion is sealed.

A recess 31 is created in the axial line on the end surface of the support plug 30 on the side that is inserted into the liner. The inner diameter of this recess 31 is in a size such that the free side axial portion 12 of the cartridge can be inserted and supported, and the depth of the recess 31 is in a size such that the free side axial portion 12 does not make contact with the bottom of the recess 31 even when it moves forward as a result of thermal expansion, and allows the cartridge and the liner to move forward and backward relative to each other. In addition, a support plug flow path 32 is created along the center axis of the support plug 30 in such a manner that the recess 31 is connected to the outside. Furthermore, a through hole is created through a side of the recess 31 so that the permeability of air into the liner can be sufficiently secured.

The sealing plug 40 engages with the fixed side opening 25a on the outside of the fixed side axial portion 13a. An annular member 41 is screwed and attached to the fixed side end portion 25, and thus, the portion between the fixed side end portion 25 and the sealing plug 40 is sealed by gaskets, not shown, which are attached to the inner peripheral surface and outer peripheral surface of the annular member 41. A fluid supplying flow path 42 is created in the sealing plug 40 so as to penetrate in the axial direction, and as described above, a coolant or a heat medium is supplied to the flow path pipe for heat exchange in the main body portion 11 of the cartridge through the fluid supplying flow path 13a created in the fixed side axial portion 13. The annular member 41 is used in order to seal the space within the liner 20 from the outside and seal the fluid supplying flow path 13a from the space within the liner 20.

Here, the fixed side axial portion 13 of the cartridge and the fixed side end portion 25 of the liner are fixed through shrink fitting, and though the shrink fitted portion is sealed, a sealing plug 40 is separately provided for double sealing so that complete sealing is secured even under the conditions of high pressure (35 MPa to 70 MPa). There may be any form for the sealing plug and the sealing structure between the opening and the sealing plug as long as highly reliable sealing can be provided.

(Manufacturing Method for Hydrogen Storage Tank)

Next, a manufacturing method for the hydrogen storage tank 1 is described. FIG. 2 is a flow chart illustrating the manufacturing process for the hydrogen storage tank 1. In addition, FIG. 3 is a schematic diagram illustrating the steps of forming a one side processed liner, and FIG. 4 is a schematic diagram illustrating the steps of forming a two side processed liner.

(a) Main Part Forming Step

First, a cartridge 10 and a one side processed liner 20', which is a half-processed product of the liner 20, are prepared. The cartridge 10 can be formed through general mechanical processing, such as cutting processing and welding, and therefore, the descriptions are omitted. The one side processed liner 20' is formed of a short cylindrical blank material B by cutting, as shown in FIG. 3, a long cylindrical pipe A made of an aluminum alloy into a necessary length (step of pipe cutting, FIG. 3(a)).

Subsequently, the short cylindrical blank material B is engaged with a mandrel, not shown, from the outside and attached to this, and a molding roller or a die in ring form is pressed against the outer peripheral surface of the short cylindrical blank material B, and thus, the outer peripheral surface of the short cylindrical blank material B is drawn. As a result, a long cylindrical blank material C, where the liner torso portion 21 is formed, is formed (torso portion cold working step, FIG. 3(b)). Here, an inspection for scratches on the inner surface of the formed liner torso portion 21 is carried out at this point in time, and after that, the liner torso portion 21 is maintained so as not to make any contact, and thus, it becomes unnecessary to inspect the inner surface.

Subsequently, the outer peripheral surface of the long cylindrical blank material C is held by a chuck apparatus, not shown, and rotated while drawing is carried out on the portion between the end with an opening on one side and a point in the vicinity of the end with an opening on one side using a molding roller so that a portion in dome form 22 and a free side end portion 23 are formed. In the above described steps, the one side processed liner 20' is formed (one side spinning step, FIG. 3(c)).

(b) Spinning Step

Subsequently, the remaining end surface of the one side processed liner 20' is processed in a state where the cartridge 10 is set inside the liner torso portion 21 and a liner 20 (two side processed liner) is formed.

A temporary support plug 50 is inserted into the free side end portion 23 of the one side processed liner 20' from the outside of the liner. A screw trench is threaded in advance within the free side end portion 23, and the temporary support plug 50 is engaged and supported. The outer peripheral surface of the liner torso portion 21 of the one side processed liner 20' is supported by the chuck apparatus 60. The cartridge 10 is inserted into the liner torso portion 21 in such a manner that the free side axial portion 12 leads, and then, the free side axial portion 12 is inserted into the recess 51 of the temporary support plug 50. Meanwhile, the fixed side axial portion 13 is pressed by a temporary support rod 51 and a pressing apparatus 61, and thus, the cartridge 10 is supported at both ends (FIG. 4(a)).

The end portion of the liner torso portion 21 on the side which is not processed is drawn using a molding roller 62 in a state where the one side processed liner 20' and the cartridge 10 are supported, and a portion in dome form 24 and a fixed side end portion 25 are formed (spinning step, FIG. 4(b)). As a result, the fixed side axial portion 13 makes contact with the fixed side end portion 25, and the outer shape of the liner 20' (two side processed liner) is finished.

(c) Heat Treatment Step

The strength of the resistance to fatigue of the aluminum alloy is increased by heating and quenching after that in a state where the temporary support plug 50 is attached.

(d) Sealing Step

The temporary support plug 50 is removed, and a support plug 30 is screwed and attached. At this time, a gasket, not shown, is attached to the support plug 30 for sealing.

In addition, an annular member 41 is attached to the outside of the fixed side axial portion 25, and a sealing plug 40 is screwed and attached. At this time, a gasket, not shown, is attached to the inner peripheral surface and the outer peripheral surface of the annular member for sealing (see FIG. 1).

(e) Step of Filling with Hydrogen Occluding Alloy

A hydrogen occluding alloy is put into the main body portion 11 of the cartridge through the support plug flow path 32 created in the support plug 30 and the cartridge flow path 12a created in the cartridge axial portion 12 so that the cartridge is filled with the hydrogen occluding alloy.

In the above steps, a hydrogen storage tank 1 where a cartridge 10 is supported only at both ends can be manufactured.

INDUSTRIAL APPLICABILITY

It is possible to apply the present invention to hydrogen fuel tanks for automobiles.

What is claimed is:

1. A hydrogen storage tank, comprising:
a cartridge comprising a cartridge main body portion in cylindrical form which is filled with a hydrogen occluding substance; a fixed side axial portion which is provided on one end side along the axial line of the cartridge main body portion; a free side axial portion which is provided on the other end side along the axial line of the cartridge main body portion, a flow path pipe for heat exchange provided in or around the cartridge, and an inner fluid supplying flow path penetrating through the fixed side axial portion in the direction of the axial line connected to the flow path pipe for heat exchange;
a liner within which the cartridge is provided comprising a liner torso portion having a space for containing the cartridge main body portion, a fixed side end portion which is provided on one end side of the liner torso portion so as to protrude via a portion in dome form and where a fixed side opening for supporting the fixed side axial portion of the cartridge is created, and a free side end portion which is provided on the other end side of the liner torso portion so as to protrude via a portion in dome form and where a free side opening for supporting the outer periphery of a support plug for supporting the free side axial portion of the cartridge is created, wherein the liner is formed of one piece of metal material without a seam between the liner torso portion and the fixed side end portion and without a seam between the liner torso portion and the free side end portion,
wherein the fixed side opening of the liner fixes and supports the fixed side axial portion of the cartridge and is sealed by a sealing plug having an outer fluid supplying flow path connected to the inner fluid supplying flow path for supplying fluid for heat exchange from outside the cartridge to the inner fluid supplying flow path,
the free side opening of the liner is sealed with the support plug,
the free side axial portion of the cartridge is provided in and supported by a recess created in the support plug so as to be moveable forward and backward in the direction of the axial line,
a support plug flow path for connecting the recess to the outside is provided in the support plug, and
a cartridge flow path comprising a through hole which penetrates through the free side axial portion so as to be connected to the cartridge main body portion is provided in the cartridge, wherein the support plug flow path and the cartridge flow path are connected via the recess.

2. The hydrogen storage tank according to claim 1, wherein the liner is formed of an aluminum alloy and a fiber reinforced resin layer is provided on the outside of the liner.

3. The hydrogen storage tank according to claim 1, wherein each of the fixed side opening of the liner and the free side opening of the liner has a diameter smaller than an outer diameter of the cartridge main body.

* * * * *